US011869499B2

United States Patent
Taki et al.

(10) Patent No.: US 11,869,499 B2
(45) Date of Patent: Jan. 9, 2024

(54) INFORMATION PROCESSING APPARATUS AND INFORMATION PROCESSING METHOD

(71) Applicant: Sony Corporation, Tokyo (JP)

(72) Inventors: Yuhei Taki, Kanagawa (JP); Hiro Iwase, Kanagawa (JP); Kunihito Sawai, Kanagawa (JP); Masaki Takase, Tokyo (JP); Akira Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 414 days.

(21) Appl. No.: 17/268,421

(22) PCT Filed: Jul. 1, 2019

(86) PCT No.: PCT/JP2019/026192
§ 371 (c)(1),
(2) Date: Feb. 12, 2021

(87) PCT Pub. No.: WO2020/039754
PCT Pub. Date: Feb. 27, 2020

(65) Prior Publication Data
US 2021/0319792 A1    Oct. 14, 2021

(30) Foreign Application Priority Data
Aug. 22, 2018 (JP) .................. 2018-155258

(51) Int. Cl.
*G10L 15/22* (2006.01)
*G10L 15/02* (2006.01)
*G10L 15/28* (2013.01)

(52) U.S. Cl.
CPC .............. *G10L 15/22* (2013.01); *G10L 15/02* (2013.01); *G10L 15/28* (2013.01); *G10L 2015/223* (2013.01)

(58) Field of Classification Search
CPC ......... G10L 15/22; G10L 15/02; G10L 15/28; G10L 2015/223; G06F 3/167
See application file for complete search history.

(56) References Cited

U.S. PATENT DOCUMENTS 5,873,064 A * 2/1999 De Armas ........... G06F 9/45512
704/E15.044
2004/0054538 A1   3/2004 Kotsinadelis
(Continued)

FOREIGN PATENT DOCUMENTS

| JP | H10-254488 A | 9/1998 |
| JP | 2002-259113 A | 9/2002 |

(Continued)

OTHER PUBLICATIONS

International Search Report and English translation thereof dated Sep. 10, 2019 in connection with International Application No. PCT/JP2019/026192.

*Primary Examiner* — Abul K Azad
(74) *Attorney, Agent, or Firm* — Wolf, Greenfield & Sacks, P.C.

(57) ABSTRACT

An information processing apparatus includes an extracting unit (133) that extracts a changing message related to a change in macro data (M), the changing message including at least one piece of first information indicating a function to be executed, and second information linked to the first information, from a user speech; a presuming unit (134) that presumes an element to be changed in the macro data (M) based on the changing message extracted by the extracting unit (133); and a changing unit (135) that changes the element to be changed in the macro data (M) presumed by the presuming unit (134), based on the changing message.

16 Claims, 11 Drawing Sheets

(56) References Cited

U.S. PATENT DOCUMENTS

2006/0031816 A1* 2/2006 Umeda .............. H04N 1/00352
717/136
2006/0095400 A1* 5/2006 Morita ................... G06Q 10/06
2008/0046251 A1 2/2008 Agapi et al.
2008/0248797 A1* 10/2008 Freeman ........... H04M 1/72454
455/425

FOREIGN PATENT DOCUMENTS

| JP | 2006-263858 A | 10/2006 |
| JP | 2011-065582 A | 3/2011 |
| WO | WO 03/060881 A1 | 7/2003 |

* cited by examiner

INFORMATION PROCESSING APPARATUS AND INFORMATION PROCESSING METHOD

CROSS REFERENCE TO RELATED APPLICATIONS

This is a U.S. National Stage Application under 35 U.S.C. § 371, based on International Application No. PCT/JP2019/026192, filed Jul. 1, 2019, which claims priority to Japanese Patent Application JP 2018-155258, filed Aug. 22, 2018, each of which is hereby incorporated by reference in its entirety.

FIELD

The present disclosure relates to an information processing apparatus and an information processing method.

BACKGROUND

Recently, devices that can be operated with a speech has come to be used widely. Furthermore, many technologies for improving the convenience of users who use such devices have been disclosed. For example, Patent Literature 1 discloses a voice macro processing apparatus enabling a user to execute an operation intended by the user using his/her voice.

CITATION LIST

Patent Literature

Patent Literature 1: JP 2002-259113 A

SUMMARY

Technical Problem

However, with the conventional technology mentioned above, if an operation sequence executed by a macro is not registered in the way intended by the user, there are chances that the macro will not put in use. Therefore, in the conventional technology, there has been a demand for making effective use of macros having been already registered.

Therefore, the present disclosure discloses an information processing apparatus and an information processing method for making effective use of a registered macro with a user speech.

Solution to Problem

To solve the problem described above, an information processing apparatus includes: an extracting unit that extracts a changing message related to a change in macro data, the changing message including at least one piece of first information indicating a function to be executed, and second information linked to the first information, from a user speech; a presuming unit that presumes an element to be changed in the macro data, based on the changing message extracted by the extracting unit; and a changing unit that changes the element to be changed in the macro data based on the changing message, the element to be changed being presumed by the presuming unit.

Moreover, according to the present disclosure, an information processing method is provided that causes a computer to execute: extracting a changing message related to a change in macro data, the changing message including at least one piece of first information indicating a function to be executed, and second information linked to the first information, from a user speech; presuming the element to be changed in the macro data based on the extracted changing message; and changing the presumed element to be changed in the macro data based on the changing message.

DESCRIPTION OF EMBODIMENTS

Figure 1:
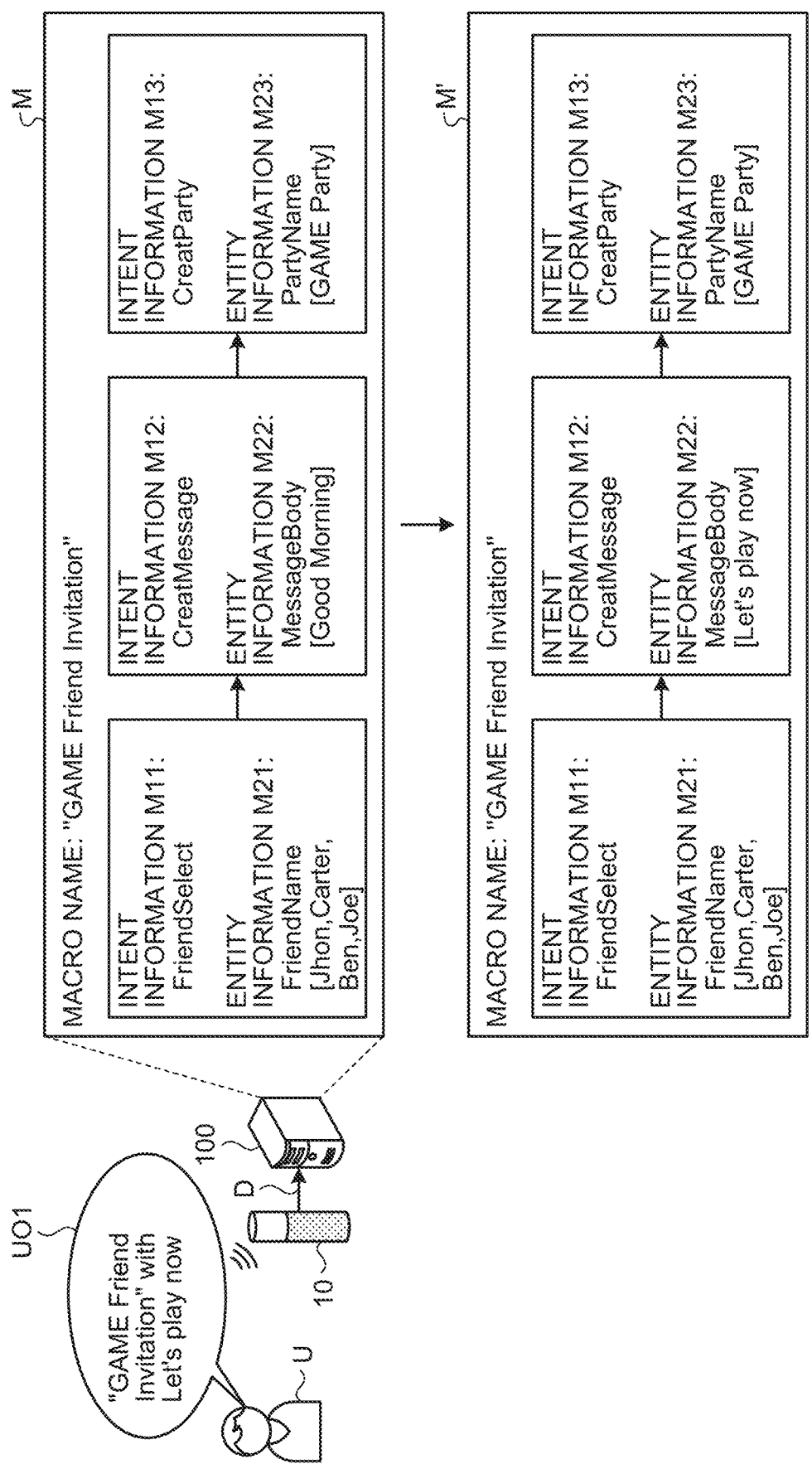
FIG. 1 is a schematic illustrating an exemplary configuration of an information processing apparatus according to an embodiment of the present disclosure.

An embodiment of the present disclosure will now be explained in detail with reference to some drawings. In the embodiment described below, the same portions will be assigned with the same reference numerals, and redundant explanations thereof will be omitted.

Embodiment

[Overview of Information Processing Apparatus According to Embodiment]

FIG. 1 is a schematic illustrating an overview of information processing according to an embodiment of the present disclosure. The information processing according to the embodiment of the present disclosure is executed by an information processing system 1 illustrated in FIG. 1. As illustrated in FIG. 1, the information processing system 1 includes a smart speaker 10 and an information processing server 100. The information processing system 1 is one example of an information processing apparatus according to the present disclosure. The smart speaker 10 and the information processing server 100 are configured to communicate with each other over a network, or directly not via the network, for example.

The smart speaker 10 is what is called an Internet-of-Things (IoT) device, and performs various types of information processing, in coordination with the information processing server 100. The smart speaker 10 is one example of a user terminal. The smart speaker 10 is sometimes referred to as an agent device, for example. Voice recognition, responding with voice, and the like executed by the smart speaker 10 are sometimes referred to as an agent function. The agent device having the agent function may be a smartphone, a tablet terminal, a game device, or the like, without limitation to the smart speaker 10. In such a case, the smartphone or the tablet terminal exerts the agent function by executing a computer program (application) having the same function as that of the smart speaker 10.

In this embodiment, the smart speaker 10 performs the information processing to collected voice. For example, the smart speaker 10 recognizes a speech of a user, and performs the information processing to the speech. In the example illustrated in FIG. 1, it is assumed that the smart speaker 10 is installed in a house that is a residence of a user U that is one example of a user who uses the smart speaker 10.

The smart speaker 10 may be configured not only to collect sound generated in a house, but also include various sensors for acquiring other various types of information, for example. The smart speaker 10 may include, for example, not only the microphone, but also a camera for capturing an image of the space, a luminance sensor for detecting luminance, a gyro sensor for detecting a tilt, and an infrared sensor for detecting an object, for example.

The smart speaker 10 recognizes a speech of a user U, and performs information processing based on the user speech. For example, the smart speaker 10 can control an external device in response to a user speech. The external device is an electronic device capable of communicating with the smart speaker 10. Examples of the external device include a game device, a television, an air conditioner, an illumination device, and an audio device. The smart speaker 10 has a configuration capable of outputting a control signal to the external device via wireless communication, and controlling the external device.

The information processing server 100 illustrated in FIG. 1 is what is called a cloud server, and is a server device for executing the information processing in coordination with the smart speaker 10. The information processing server 100 acquires a user speech collected by the smart speaker 10, analyzes the acquired user speech, and controls information processing depending on the analyzed user speech. The information processing server 100 can then request execution of the information processing from the smart speaker 10. For example, the information processing server 100 performs operations such as execution of a macro corresponding to a user speech, or requesting the execution of the macro from the smart speaker 10. A macro is a technology in which one or more instructions for executing functions are registered, and enables the functions to be executed when the macro is called. An example of the macro includes a voice macro enabling use of voice in performing a function or an operation to an application, an electronic device, or the like.

The information processing server 100 manages macro data M indicating a macro related to a user U. The macro data M includes data indicating a function to be executed. The macro data M has a configuration indicating a plurality of functions to be executed, and an order in which the functions are to be executed. The macro data M establishes links among a macro name, intent information, and entity information, for example. The intent information includes information indicating a function, for example. The intent information is one example of first information. The entity information includes information such as information that can be designated in executions of the intent information linked thereto (e.g., parameter or the like), and information indicating whether to enable or to disable the intent information, for example. The entity information is one example of the second information. The macro data M may establish links between one macro name to a plurality of pieces of intent information. The macro data M may also establish links between one piece of intent information to a plurality of pieces of entity information.

In the example illustrated in FIG. 1, the information processing server 100 manages a piece of macro data M having a macro name "GAME Friend Invitation". A macro name serves as a trigger for an execution of the macro data M. The macro data M is data indicating a macro that executes a function for generating a party of friends to be invited to the GAME. The macro data M indicates intent information M11, intent information M12, and intent information M13. The intent information M11 indicates a function (FriendSelect) for selecting friends. The intent information M12 indicates a function (CreatMessage) for generating a message. The intent information M13 indicates a function (CreatParty) for generating a party. The macro data M indicates that the functions are to be executed in the order of the intent information M11, the intent information M12, and the intent information M13.

The macro data M establishes a link between the intent information M11 and entity information M21. The entity information M21 indicates information (FriendName) indicating the names of the friends. For example, to the entity information M21, "Jhon", "Carter", "Ben", and "Joe" are set, as the names of the friends. The macro data M also establishes a link between the intent information M12 and entity information M22. The entity information M22 indicates information indicating the body of a message (MessageBody). For example, to the entity information M22, "Good Morning" is set as the message body. The macro data M also establishes a link between the intent information M13 and entity information M23. The entity information M23 indicates information indicating the name of the party (PartyName). For example, to the entity information M23, "GAME Party" is set as the name of the party.

For example, when the user U requests an execution of a macro indicated in the macro data M, the information processing server 100 causes the smart speaker 10 to execute the macro data M. In such a case, the smart speaker 10 executes the function (FriendSelect) for selecting friends in the intent information M11. As a result, the information processing server 100 selects "Jhon", "Carter", "Ben", "Joe" in the entity information M21 as friends. The smart speaker 10 then executes the function for generating a message (CreatMessage) in the intent information M12. As a result, the smart speaker 10 generates a message "Good Morning" in the entity information M22 as a message body. The smart speaker 10 executes a function for generating a party (CreatParty) in the intent information M13. As a result, the smart speaker 10 generates a party with the name "GAME Party" in the entity information M23, and starts the "GAME".

In the example illustrated in FIG. 1, the user U makes a user speech UO1, in order to change the macro data M "GAME Friend Invitation" while executing the macro data M. The user speech UO1 indicates "GAME Friend Invitation" with Let's play now", for example. In other words, the user speech UO1 includes a macro name and a message to be changed.

The smart speaker 10 collects the user speech UO1, and transmits speech data D indicating the collected user speech UO1 to the information processing server 100. At this time, the smart speaker 10 also transmits data identifying the user U to the information processing server 100.

When the speech data D is received, the information processing server 100 analyzes the speech data D. For example, the information processing server 100 performs automatic speech recognition (ASR) process and natural language understanding (NLU) process based on the user speech UO1, and understand the speech data D. In this case, the information processing server 100 extracts a first message indicating the macro name, and a second message related to a change in the macro data M, from the speech data D. The second message is one example of a changing message. In this case, the information processing server 100 extracts "GAME Friend Invitation" from the speech data D as the first message. The information processing server 100 then extracts "Let's play now" from the speech data D as the second message. One example of the method for extracting the second message will be described later.

Once the first message indicating the macro name is extracted from the speech data D, the information processing server 100 acquires the macro data M having the macro name. The information processing server 100 presumes the element to be edited in the macro data M, based on the second message extracted from the speech data D and a presuming table. The presuming table includes information such as messages, words, and synonyms, for presuming the intent information and the entity information of the macro data M, for example. In this case, because there is a possibility that the second message is a message body, the information processing server 100 presumes the element to be changed in the macro data M as the entity information M22. The information processing server 100 then changes the entity information M22 that is the presumed element to be edited in the macro data M based on the second message. In this case, the information processing server 100 changes "Good Morning" set in the entity information M22 to "Let's play now". The information processing server 100 requests an execution of the macro specified in the macro data M after the change, from the smart speaker 10. The smart speaker 10 then executes the macro data M' after the change.

For example, the smart speaker 10 executes the function (FriendSelect) for selecting friends in the intent information M11 of the macro data M'. As a result, the smart speaker 10 selects "Jhon", "Carter", "Ben", and "Joe" in the entity information M21 as friends. The smart speaker 10 executes the function for generating a message (CreatMessage) in the intent information M12. As a result, the smart speaker 10 generates a message having "Let's play now" in the changed entity information M22 as a message body. The smart speaker 10 then executes the function for generating a party (CreatParty) in the intent information M13. As a result, the smart speaker 10 generates a party with the name "GAME Party" in the entity information M23, and starts the "GAME".

In the manner described above, when a macro is to be executed by a speech made by a user U, the information processing server 100 according to the embodiment changes the macro data M based on the second message that is not the first message that serves as a trigger for an execution of the macro data M. In this manner, the information processing server 100 can change registered macro data M3 based on the user speech, and execute the macro data M3 after the change. Furthermore, because the user only needs to utter a speech serving as a trigger for an execution of the macro data M and a detail of a change, the user can change the macro data M easily. As a result, the information processing server 100 can make effective use of the registered macro data M with a user speech, so that the convenience of the user U can be improved.

For example, when the registered macro data M is not configured in the way that the user U intends, there is a chance that the macro becomes less effective because the number of steps of the macro increases, or the functions executed by the macro fall short. If unnecessary functions are included in the macro data M, or intended functions are not included, sometimes such macro data M is not put in use by the user U. Because the information processing server 100 according to the embodiment can execute the registered macro data M while applying a correction thereto based on the user speech, it is possible to make effective use of the macro data M. As a result, the user U no longer need to register new macro data to execute a function that the user wants.

[Exemplary Configuration of Information Processing System According to Embodiment]

Figure 2:
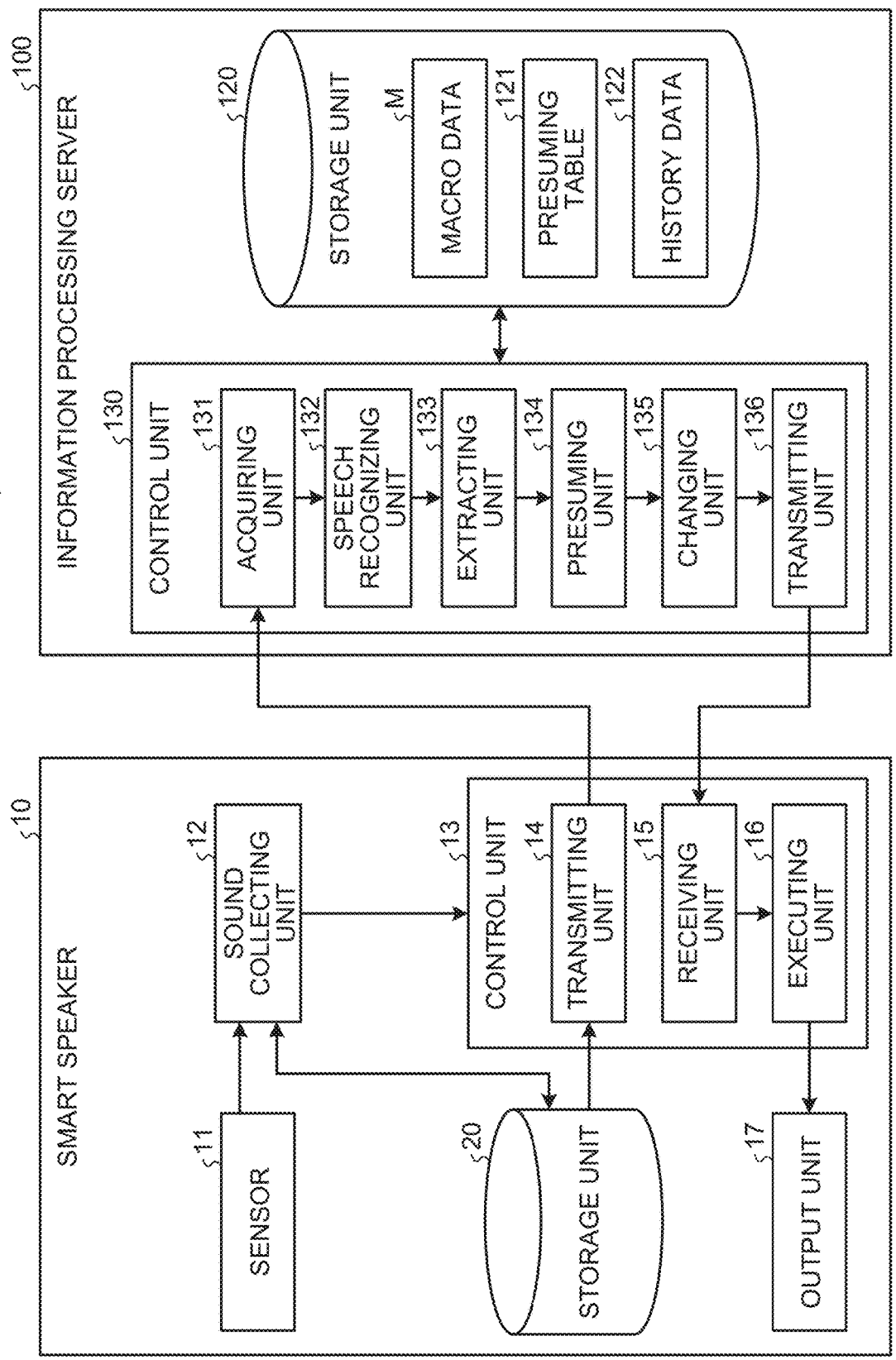
FIG. 2 is a schematic illustrating an exemplary configuration of an information processing system according to the embodiment.

A configuration of the information processing system 1 including the smart speaker 10 and the information processing server 100 will now be explained, as an example of the information processing apparatus according to the embodiment. FIG. 2 is a schematic illustrating an exemplary configuration of the information processing system 1 according to the embodiment. As illustrated in FIG. 2, the information processing system 1 includes the smart speaker 10 and the information processing server 100.

[Smart Speaker 10]

As illustrated in FIG. 2, the smart speaker 10 includes processing units such as a sound collecting unit 12 and a control unit 13. The control unit 13 controls the operation of the smart speaker 10. The control unit 13 includes a transmitting unit 14, a receiving unit 15, and an executing unit 16. These processing units are implemented by causing a central processing unit (CPU) or a micro-processing unit (MPU) to execute a computer program stored internally to the smart speaker 10, using a random access memory (RAM) or the like, as a working area, for example. Furthermore, these processing units may be implemented in an integrated circuit such as an application-specific integrated circuit (ASIC) or a field-programmable gate array (FPGA).

The sound collecting unit 12 collects voice by controlling a sensor 11 provided to the smart speaker 10. An example of the sensor 11 is a microphone. The sensor 11 may also include a function for detecting various types of information related to actions of the user such as an orientation, an inclination, a movement, or a moving speed. In other words, the sensor 11 may also be a camera for capturing an image of the user or the environment around the user, or an infrared sensor for detecting the presence of the user U. The sensor 11 may also detect information about the circumstance under which the user U made the speech (context).

The sound collecting unit 12 collects voice, and also stores the collected voice in a storage unit 20. The sound collecting unit 12 is one example of a collecting unit. The storage unit 20 is capable of temporarily storing therein the collected voice. The storage unit 20 is implemented as, for example, a random access memory (RAM), a semiconductor memory device such as a flash memory, or a storage device such as a hard disk or an optical disc. The storage unit 20 may also store therein information capable of identifying the user U, for example.

The control unit 13 performs, when a speech is collected by the sound collecting unit 12, control for transmitting the speech data D indicating the speech to the information processing server 100. The control unit 13 also performs control to execute the macro data M requested by the information processing server 100. In the example illustrated in FIG. 2, the control unit 13 can provide various functions, based on the processes executed by the processing units including the transmitting unit 14, the receiving unit 15, and the executing unit 16.

The transmitting unit 14 transmits various types of information over a wired or wireless network, for example. For example, the transmitting unit 14 transmits, when a speech is collected, the speech data D to the information processing server 100. The transmitting unit 14 may also transmit identification data for identifying the user U, as well as the speech data D, to the information processing server 100.

The receiving unit 15 receives a request generated by the information processing server 100. For example, when the speech data D received from the transmitting unit 14 includes a message serving as a trigger for an execution of a macro, the receiving unit 15 receives a request for executing the macro from the information processing server 100. The receiving unit 15 may receive voice data, or receive text data from the information processing server 100.

The executing unit 16 performs control for executing the request received by the receiving unit 15. For example, the executing unit 16 controls to output voice from an output unit 17 with a voice output function (such as a speaker). When the output unit 17 is a display, the executing unit 16 may also perform a control process for displaying data such as a text or an image on the display, in accordance with the execution of the macro. The executing unit 16 executes a macro for which a request is received from the information processing server 100.

[Information Processing Server 100]

One example of a configuration of the information processing server 100 will now be explained. As illustrated in FIG. 2, the information processing server 100 includes a storage unit 120 and a control unit 130. The control unit 130 includes processing units such as an acquiring unit 131, a speech recognizing unit 132, an extracting unit 133, a presuming unit 134, a changing unit 135, and a transmitting unit 136.

The storage unit 120 is implemented as, for example, a RAM, a semiconductor memory device such as a flash memory, or a storage device such as a hard disk or an optical disc. The storage unit 120 stores therein the speech data D acquired from the smart speaker 10. The storage unit 120 also stores therein the macro data M. The storage unit 120 stores therein the macro data M that is linked to the user U. The storage unit 120 stores therein a presuming table 121 and history data 122. The presuming table 121 has information such as character sequences, words, and synonyms for presuming the intent information and the entity information of the macro data M, and is linked to the macro data M. For example, the presuming table 121 contains function information such as words, character sequences, values corresponding to the function indicated in the intent information, and similarity information such as synonyms similar to the function state. The presuming table 121 includes information indicating words, character sequences, values received by the intent information corresponding to the entity information. The history data 122 includes information indicating a history of executions of the macro data M, caused to be executed by a speech of the user U. As the execution history, the history data 122 includes information identifying the user U who has executed the macro data M, and context indicating the circumstance under which the macro data M is executed, for example.

Explained above in this embodiment is an example in which the information processing server 100 stores the macro data M in the storage unit 120 in a manner linked to the user U, but the embodiment is not limited thereto. For example, the information processing server 100 may also acquire the macro data M stored in another storage device, for example, and store the macro data M temporarily in the storage unit 120.

These processing units of the control unit 130 are implemented by causing a CPU, an MPU, or the like to execute a computer program stored internally to the information processing server 100, using a RAM or the like, as a working area, for example. The processing units included in the control unit 130 may also be implemented in an integrated circuit such as an ASIC or an FPGA.

The acquiring unit 131 acquires the speech data D transmitted by the smart speaker 10 over a wired or wireless network, for example. For example, when the smart speaker 10 transmits the speech data D, the acquiring unit 131 acquires the speech data D, and stores the speech data D in the storage unit 120.

The speech recognizing unit 132 converts the speech data D acquired by the acquiring unit 131 into a character sequence. For example, the speech recognizing unit 132 may use an automatic speech recognition (ASR) process, for example. The speech recognizing unit 132 stores the converted character sequence in the storage unit 120.

The extracting unit 133 extracts the first message serving as a trigger for an execution of the macro data M and the second message related to a change in the macro data M, from the character sequence recognized by the speech recognizing unit 132. For example, the extracting unit 133 analyzes the character sequence recognized by the speech recognizing unit 132, using a natural language understanding (NLU) process, for example. Specifically, the extracting unit 133 analyzes whether the macro name of macro data M is included in the character sequence. When a macro name is detected, the extracting unit 133 extracts the character sequence indicating the macro name as the first message, and analyzes whether the character sequence includes a character sequence related to a change in the macro data M. Specifically, the extracting unit 133 analyzes whether the character sequence includes a character sequence, a word, a synonym, or the like indicated in the presuming table 121 corresponding to the macro name. If a message such as a character sequence, a word, a number, or the like related to a change is detected, the extracting unit 133 extracts the message as the second message. If no message related to a change is detected, the extracting unit 133 does not extract the second message. If the extracting unit 133 has succeeded in extracting a character sequence corresponding to a macro name as the first message, but fails to analyze another character sequence, the extracting unit 133 may output a notification to the presuming unit 134.

For example, let us assume that the storage unit 120 stores therein macro data M with a macro name "check morning news", and that the user U made a speech as "check morning news in one minute". In this case, the extracting unit 133 extracts the character sequence "check morning news" that is a macro name as the first message, and extracts the character sequence "in one minute" as the second message.

It is now assumed that the user U made a speech "check morning news in the afternoon". In this case, the extracting unit 133 extracts the character sequence "check morning news" that is a macro name as the first message, and extracts the character sequence "in the afternoon" as the second message. In this manner, by extracting the first message and the second message from a user speech, the extracting unit 133 can determine whether the user U has an intention to change the macro data M. By extracting the second message from a user speech including the first message, the extracting unit 133 can improve the accuracy at which the second message is extracted.

Explained in this embodiment is an example in which the extracting unit 133 analyzes the character sequence recognized by the speech recognizing unit 132, but the embodiment is not limited thereto. For example, it is possible to use a configuration in which the extracting unit 133 does not analyze the character sequence but acquires the analysis result of a character sequence, the result being analyzed by another character analyzing device or the like.

The presuming unit 134 presumes the element to be changed in the macro data M based on the second message extracted by the extracting unit 133. The presuming unit 134 presumes an element to be changed in the macro data M that can be changed by the second message. For example, the presuming unit 134 may compare the second message with the presuming table 121 corresponding to the macro name, and presumes the element to be changed in the macro data M based on the comparison result. If the second message is a message related to the entity information in the macro data M, the presuming unit 134 presumes that the entity information in the macro data M is to be changed. If the second message is a message related to the intent information in the macro data M, the presuming unit 134 presumes that the intent information in the macro data M is to be changed. The presuming unit 134 then presumes whether the second message is a message for adding intent information to the macro data M, or is a message for deleting the intent information in the macro data M, based on the second message and the presuming table 121.

For example, there are sometimes cases in which the extracting unit 133 extracts the second message from a new user speech that does not include any first message, during the period before first time expires from when the first message is extracted by the extracting unit 133. The first time includes two or three minutes, for example. In this case, the presuming unit 134 presumes the element to be changed in the macro data M corresponding to the first message immediately preceding the extraction of the second message, based on the second message. In this manner, the user U can change the macro data M with a speech, before the first time elapses from when the macro name is spoken.

The changing unit 135 changes the element to be changed in the macro data M, the element to be changed being presumed by the presuming unit 134, based on the second message. The changing unit 135 changes the entity information presumed by the presuming unit 134 based on the second message. For example, the changing unit 135 changes setting information for the entity information presumed by the presuming unit, based on the second message. Specifically, the changing unit 135 changes the function indicating the entity information in the macro data M, or enables or disables the function, by adding or deleting the setting information. The changing unit 135 can execute a process for confirming a change in a plurality of pieces of entity information presumed by the presuming unit 134. The changing unit 135 can enable the user U to confirm what the change or the like is, by causing the smart speaker 10 to output voice data or the like for allowing the user U to confirm the change.

The changing unit 135 changes the intent information presumed by the presuming unit 134 based on the second message. When the presuming unit 134 presumes that the second message is a message for adding intent information to the macro data M, the changing unit 135 adds the intent information to the macro data. When the presuming unit 134 presumes that the second message is a message for deleting the intent information from the macro data M, the changing unit 135 deletes the intent information from the macro data M, or disables the intent information.

The changing unit 135 has a function for changing the macro data M based on the second message and the history data 122. The changing unit 135 has a function for changing the macro data M based on the timing at which the first message is extracted by the extracting unit 133, and on the history data 122. For example, the history data 122 indicates that the macro data M is to be changed during weekday mornings. In this case, upon being requested by the user U to execute the macro data M, the changing unit 135 changes the macro data M based on the detail of the change in the history data 122.

The changing unit 135 has a function for changing the macro data M stored in the storage unit 120 to the macro data after the change. For example, when the macro data M is changed, and the history data 122 indicates that the probability at which the macro data M is changed has exceeded a determination threshold, the changing unit 135 then replaces the macro data M stored in the storage unit 120 with the macro data M after the change. The changing unit 135 then notifies the user U of the replacement of the macro data M. In this manner, when the macro data M is to be executed, the user U can understand that the user U no longer needs to speak the second message.

The transmitting unit 136 transmits the macro data M changed by the changing unit 135, an execution request, or the like to the smart speaker 10, over a wired or wireless network, for example. When the user U only speaks the first message serving as a trigger for an execution of the macro data M, the transmitting unit 136 transmits the macro data M, the execution request, and the like in the storage unit 120 to the smart speaker 10.

[Sequence of Information Processing According to Embodiment]

Figure 3:
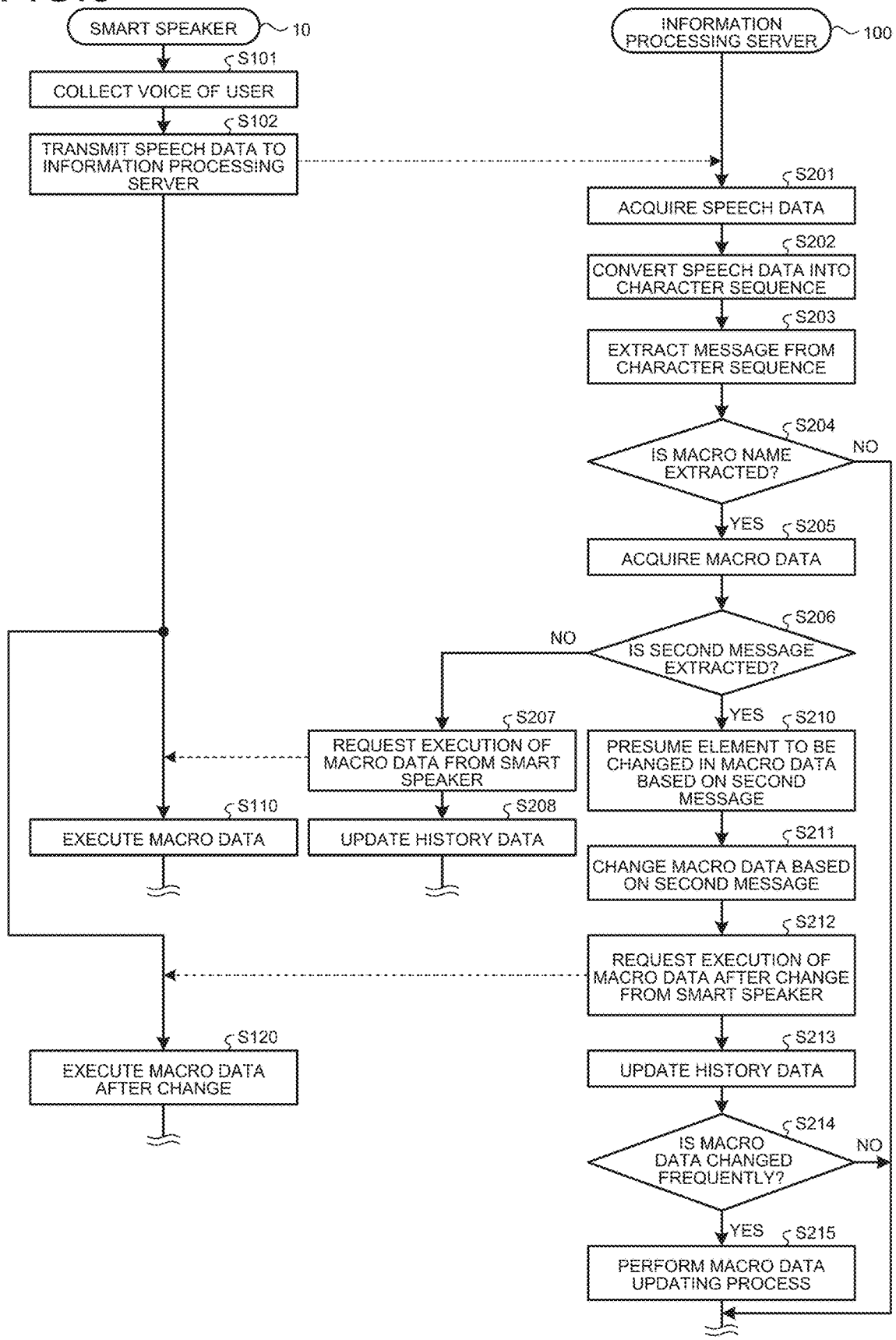
FIG. 3 is a sequence chart illustrating one example of the sequence of information processing according to the embodiment.

The sequence of information processing according to the embodiment will now be explained with reference to FIG. 3. FIG. 3 is a sequence chart illustrating one example of the sequence of information processing according to the embodiment. The processing sequence illustrated in FIG. 3 is implemented by the smart speaker 10 and the information processing server 100 executing a computer program.

As illustrated in FIG. 3, the smart speaker 10 causes the sound collecting unit 12 to collect the voice of the user U (Step S101). The smart speaker 10 then transmits the speech data D indicating the collected voice to the information processing server 100 (Step S102).

The information processing server 100 acquires the speech data from the smart speaker 10 (Step S201). The information processing server 100 causes the speech recognizing unit 132 to convert speech data into a character sequence (Step S202). The information processing server 100 then causes the extracting unit 133 to extract a message from the character sequence (Step S203). For example, when the speech data includes a macro name and a message accompanying the macro name, the information processing server 100 extracts the first message indicating the macro name, and the second message indicating others. For example, if the speech data includes a macro name only, the information processing server 100 extracts the first message.

The information processing server 100 determines whether the macro name has been extracted from the speech data (Step S204). For example, when the first message has been extracted by the extracting unit 133, the information processing server 100 determines that the macro name has been extracted. If it is determined that the macro name has not been extracted (No at Step S204), the information processing server 100 then ends the processing sequence illustrated in FIG. 3. If it is determined that the macro name has been extracted (Yes at Step S204), the information processing server 100 shifts the process to Step S205.

The information processing server 100 acquires the macro data M from the storage unit 120 (Step S205). For example, the information processing server 100 acquires the macro data M having a macro name indicated by the extracted first message. The information processing server 100 then determines whether the second message has been extracted from the speech data (Step S206). For example, if the second message has been extracted by the extracting unit 133, the information processing server 100 determines that the second message has been extracted.

If it is determined that the second message has not been extracted (No at Step S206), because there is only the first message, the information processing server 100 shifts the process to Step S207. The information processing server 100 then requests an execution of the macro data M from the smart speaker 10 (Step S207). For example, the information processing server 100 transmits the request including the macro data M to the smart speaker 10 via the transmitting unit 136. The information processing server 100 then updates the history data 122 (Step S208). For example, the information processing server 100 stores information such as the information identifying the macro data M, the day and the time at which the macro data M is executed, an indication that the macro data M has not been changed, and the user U having executed the macro data M, in the history data 122. The information processing server 100 then goes into a standby state.

The smart speaker 10 receives a request for the macro data M via the receiving unit 15, and causes the executing unit 16 to execute the macro data M (Step S110). As a result, the smart speaker 10 executes the registered macro data M as it is.

If it has been determined that the second message has been extracted (Yes at Step S206), the information processing server 100 shifts the process to Step S210. The information processing server 100 then causes the presuming unit 134 to presume the element to be changed in the macro data M based on the second message (Step S210). The information processing server 100 changes the macro data M, based on the second message (Step S211). In other words, the information processing server 100 changes the element to be changed in the macro data M with the second message. If the macro data M is changed, the information processing server 100 shifts the process to Step S212.

The information processing server 100 requests an execution of the macro data M after the change from the smart speaker 10 (Step S212). For example, the information processing server 100 transmits the request including the macro data M after the change to the smart speaker 10 via the transmitting unit 136. The information processing server 100 then updates the history data 122 (Step S213). For example, the information processing server 100 stores information such as information identifying the macro data M, the day and the time at which the macro data M is executed, an indication that the macro data M has been changed, the detail of the change of the macro data M, the user U who executed the macro data M, and the like, in the history data 122.

When a request for the macro data M after the change is received via the receiving unit 15, the smart speaker 10 causes the executing unit 16 to execute the macro data M after the change (Step S120). As a result, the smart speaker 10 executes the function indicating the macro data M after the change.

Furthermore, when the update of the history data 122 is finished, the information processing server 100 determines whether the macro data M is changed frequently (Step S214). For example, the information processing server 100 refers to the history data 122, and, if the frequency at which the macro data M is changed is more than a determination threshold, determines that the macro data M is changed frequently. If it has been determined that the macro data M is not being changed frequently (No at Step S214), the information processing server 100 then ends the processing sequence illustrated in FIG. 3. In other words, the information processing server 100 does not change the macro data M stored in the storage unit 120.

If it has been determined that the macro data M is changed frequently (Yes at Step S214), the information processing server 100 shifts the process to Step S215. The information processing server 100 then performs the macro data updating process (Step S215). For example, by performing the macro data changing process, the information processing server 100 replaces the macro data M stored in the storage unit 120 with the macro data M after the change. The information processing server 100 then goes into a standby state. The macro data changing process may also be a process for asking the user U to confirm the change in the macro data M, and for updating the macro data M stored in the storage unit 120 when the user U confirms OK.

[Information Processing Performed by Information Processing System According to Embodiment]

Figure 4:
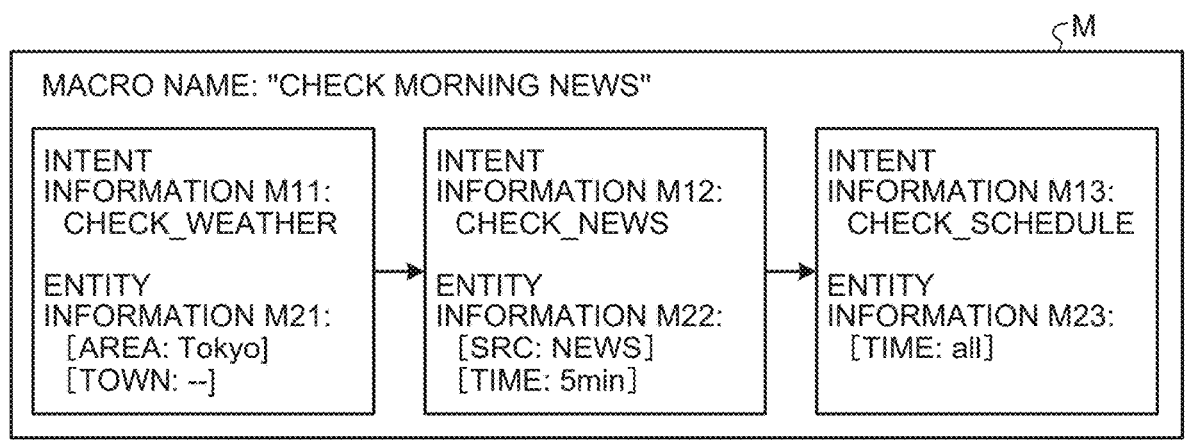
FIG. 4 is a schematic illustrating one example of macro data according to the embodiment.
Figure 5:
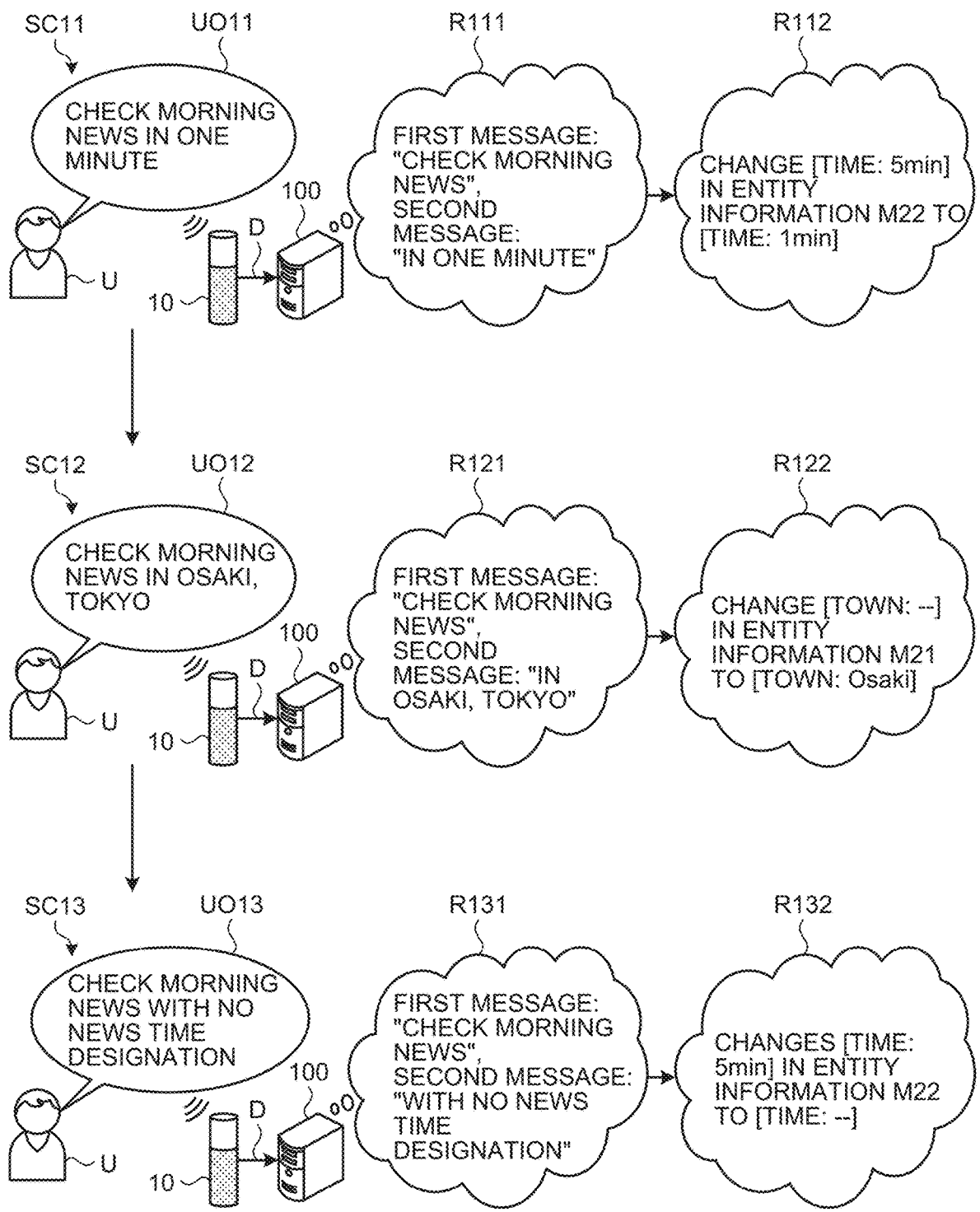
FIG. 5 is a schematic illustrating one example of information processing performed by the information processing system according to the embodiment.
Figure 6:
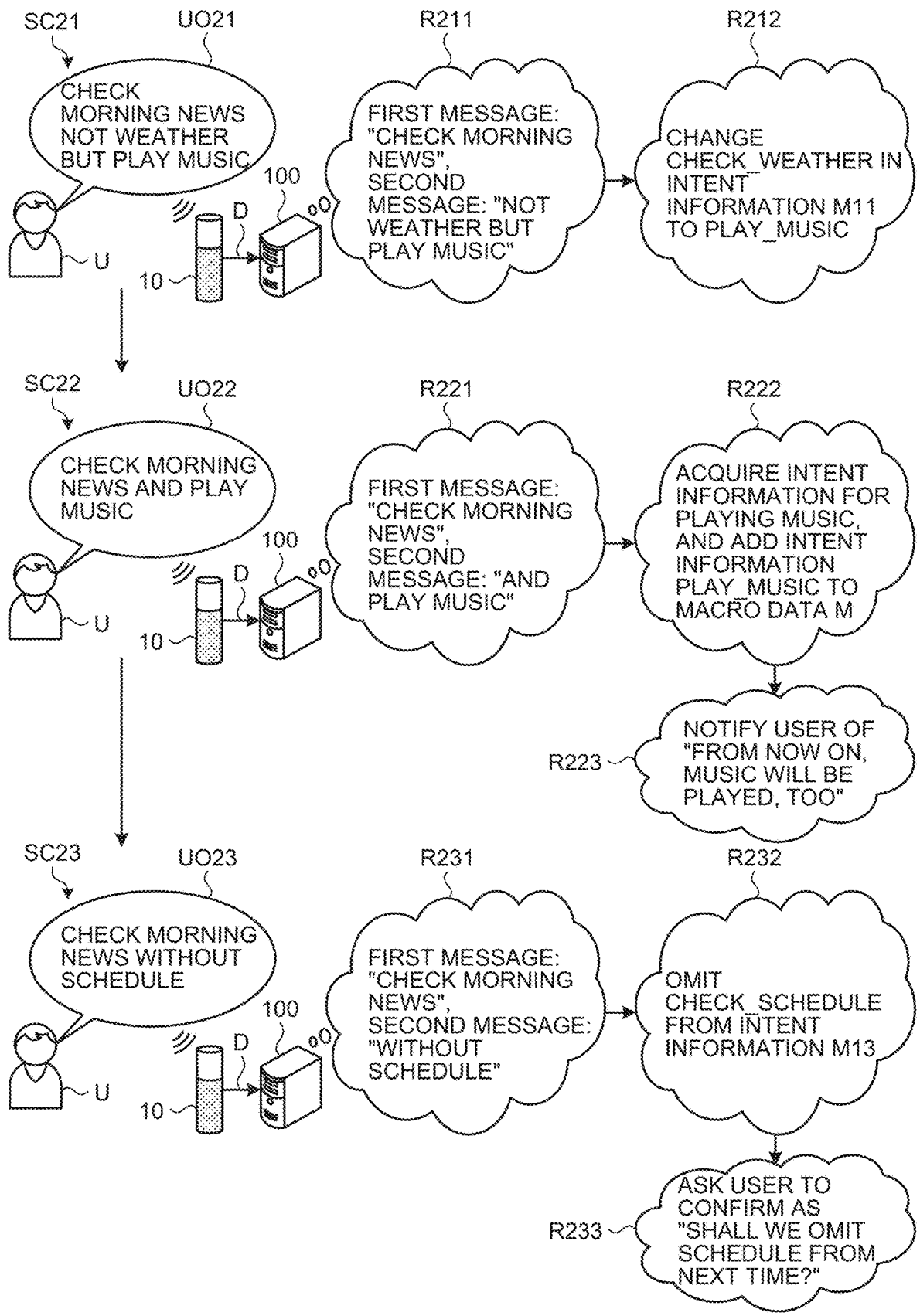
FIG. 6 is a schematic illustrating one example of another information processing performed by the information processing system according to the embodiment.

One example of information processing performed by the information processing system 1 according to the embodiment will now be explained with reference to FIGS. 4 to 6. FIG. 4 is a schematic illustrating one example of the macro data M according to the embodiment. FIG. 5 is a schematic illustrating one example of the information processing performed by the information processing system 1 according to the embodiment. FIG. 6 is a schematic illustrating one example of another information processing performed by the information processing system 1 according to the embodiment.

In one example illustrated in FIG. 4, the information processing server 100 manages the macro data M having a macro name "check morning news". To the macro data M, CHECK_WEATHER is set as the intent information M11. CHECK_WEATHER indicates the name of a module (function) for checking weather. To the macro data M, [AREA: Tokyo], [Town: --] are set, as the entity information M21 of the intent information M11. The entity information M21 includes setting item information such as AREA and Town, and also includes setting information set to the setting item information, for example. [AREA: Tokyo] is a parameter of CHECK_WEATHER, and indicates that the area to be checked is Tokyo. [Town: --] is a parameter of CHECK_WEATHER, and indicates that the town to be checked has not been set yet. In other words, CHECK_WEATHER in the intent information M11 means that [AREA: Tokyo], [Town: --] are changeable.

To the macro data M, CHECK_NEWS is set, as the intent information M12 next to the intent information M11. CHECK_NEWS indicates the name of a module for checking a news. To the macro data M, [SRC: NEWS], [TIME: 5 min] are set, as the entity information M22 of the intent information M12. The entity information M22 includes, for example, setting item information such as SRC and TIME, and setting information set to the setting item information. [SRC: NEWS] is a parameter of CHECK_NEWS, and indicates that the item to be searched is a news. [TIME: 5 min] is a parameter of CHECK_NEWS, and indicates a 5-minute news. In other words, CHECK_NEWS in the intent information M12 means that [SRC: NEWS], [TIME: 5 min] are changeable.

To the macro data M, CHECK_SCHEDULE is set as the intent information M13 next to the intent information M12. CHECK_SCHEDULE indicates the name of a module for checking a schedule of the user U. To the macro data M, [TIME: all] is set as the entity information M23 of the intent information M13. The entity information M23 includes setting item information such as TIME, and setting information set to the setting item information, for example. [TIME: all] is a parameter of CHECK_SCHEDULE, and indicates to read out all of the today's schedule. In other words, CHECK_SCHEDULE in the intent information M13 means that [TIME: all] is changeable.

In a scene SC11 illustrated in FIG. 5, the user U makes a user speech UO11 "check morning news in one minute", in order to cause the macro data M illustrated in FIG. 4 to be executed while making a change thereto. In this case, the smart speaker 10 transmits the speech data D indicating the user speech UO11 to the information processing server 100. The information processing server 100 analyzes the received speech data D, and extracts the first message and the second message from the user speech UO11. As indicated in a state R111, the information processing server 100 extracts the first message indicating "check morning news", and the second message indicating "in one minute". The information processing server 100 then presumes the element to be changed in the macro data M, based on the second message and the presuming table 121. In this case, because the second message is time, the information processing server 100 presumes [TIME: 5 min] in the entity information M22 in the macro data M as the element to be changed. As indicated in a state R112, the information processing server 100 changes [TIME: 5 min] in the entity information M22 in the macro data M to [TIME: 1 min]. The information processing server 100 then causes the smart speaker 10 to execute the macro data M after the change. As a result, the smart speaker 10 checks and notifies the user U of the weather information in Tokyo, one minute news, and today's schedule.

In a scene SC12 illustrated in FIG. 5, the user U makes a user speech UO12 "check morning news in Osaki, Tokyo", in order to cause the macro data M illustrated in FIG. 4 to be executed while making a change thereto. In this case, the smart speaker 10 transmits the speech data D indicating the user speech UO12 to the information processing server 100. The information processing server 100 analyzes the received speech data D, and extracts the first message and the second message from the user speech UO12. As indicated in a state R121, the information processing server 100 extracts the first message indicating "check morning news", and the second message indicating "in Osaki, Tokyo". The information processing server 100 then presumes the element to be changed in the macro data M, based on the second message and the presuming table 121. In this case, because the second message includes the name of a location, the information processing server 100 presumes [Town: --] in the entity information M21 in the macro data M, as the element to be changed. As indicated in a state R122, the information processing server 100 changes [Town: --] in the entity information M21 in the macro data M to [Town: Osaki]. In other words, the information processing server 100 adds a setting [Town: Osaki] to the entity information M21 in the macro data M. The information processing server 100 then causes the smart speaker 10 to execute the macro data M after the change. As a result, the smart speaker 10 checks and notifies the user U of the weather information in Osaki, Tokyo, five-minute news, and today's schedule.

In a scene SC13 illustrated in FIG. 5, the user U makes a user speech UO13 "check morning news with no news time designation", in order to cause the macro data M illustrated in FIG. 4 to be executed while making a change thereto. In this case, the smart speaker 10 transmits the speech data D indicating the user speech UO13 to the information processing server 100. The information processing server 100 analyzes the received speech data D, and extracts the first message and the second message from the user speech UO13. As indicated in a state R131, the information processing server 100 extracts the first message indicating "check morning news", and the second message indicating "with no news time designation". The information processing server 100 then presumes the element to be changed in the macro data M, based on the second message and the presuming table 121. In this case, because the second message is related to a designation of time of the news, the information processing server 100 presumes [TIME: 5 min] in the entity information M22 in the macro data M, as the element to be changed. As indicated in a state R132, the information processing server 100 changes [TIME: 5 min] in the entity information M22 in the macro data M to [TIME: -]. In other words, the information processing server 100 deletes the setting [TIME: 5 min] from the entity information M22 in the macro data M. The information processing server 100 then causes the smart speaker 10 to execute the macro data M after the change. As a result, the smart speaker 10 checks and notifies the user U of the weather information in Tokyo, one minute news, and today's schedule.

As described above, when the second message is a message related to the entity information in the macro data M, the information processing server 100 according to the embodiment changes the entity information that can be changed with the second message. In this manner, with the second message spoken with the first message, the information processing server 100 can change the entity information in the macro data M. As a result, because the information processing server 100 can change a part of the functions in the macro data M with voice, the convenience of the user U can be improved further.

Furthermore, the entity information M21, M22, M23 includes setting item information and setting information, and the information processing server 100 changes the setting information. In this manner, the information processing server 100 can presume the element to be changed in the second message by focusing on the setting items. As a result, because a change, an addition, or a deletion of the entity information can be made in the macro data M, the information processing server 100 can make effective use of the macro data M.

For example, there are sometimes cases where it is not possible to presume a piece of entity information when the second message is a message related to a plurality of pieces of the entity information M21, M22, M23 in the macro data M. In this case, the information processing server 100 may be configured to presume a plurality of changeable pieces of second information in the second message as an element to be changed, and to ask the user U whether to change the element of change. As a result, because the information processing server 100 can ask the user U to confirm the entity information to be changed, and change the entity information, the accuracy at which the macro data M is changed can be improved.

In a scene SC21 illustrated in FIG. 6, the user U makes a user speech UO21 "check morning news not weather but play music", in order to cause the macro data M illustrated in FIG. 4 to be executed while making a change thereto. In this case, the smart speaker 10 transmits the speech data D indicating the user speech UO21 to the information processing server 100. The information processing server 100 analyzes the received speech data D, and extracts the first message and the second message from the user speech UO21. As indicated in a state R211, the information processing server 100 extracts the first message indicating "check morning news", and the second message indicating "not weather but play music". The information processing server 100 then presumes the element to be changed in the macro data M, based on the second message and the presuming table 121. In this case, because the second message implies a change of the weather, the information processing server 100 presumes CHECK_WEATHER in the intent information M11, as the element to be changed. The information processing server 100 searches for a play music function module, the macro data M, and the like, and detects the module PLAY_MUSIC. The information processing server 100 then changes CHECK_WEATHER in the intent information M11 to PLAY_MUSIC, as indicated in a state R212. When the intent information M11 is changed to PLAY_MUSIC, and if a change in the entity information M21 is required, the information processing server 100 also changes the setting of the entity information M21. The information processing server 100 then causes the smart speaker 10 to execute the macro data M after the change. As a result, the smart speaker 10 plays music, and notifies the user U of checked five-minute news and today's schedule.

In a scene SC22 illustrated in FIG. 6, the user U makes a user speech UO22 "check morning news and play music", in order to cause the macro data M illustrated in FIG. 4 to be executed while making a change thereto. In this case, the smart speaker 10 transmits the speech data D indicating the user speech UO22 to the information processing server 100. The information processing server 100 analyzes the received speech data D, and extracts the first message and the second message from the user speech UO22. As indicated in a state R221, the information processing server 100 extracts the first message indicating "check morning news", and the second message indicating "and play music". The information processing server 100 then presumes the element to be changed in the macro data M, based on the second message and the presuming table 121. In this case, because the second message implies an addition of play music (intent information) to the macro data M, the information processing server 100 establishes the macro data M as the element to be changed. The information processing server 100 searches for a play music function module, the macro data M, and the like, for example, and detects the intent information PLAY_MUSIC. The information processing server 100 acquires the intent information for playing music, and adds the intent information PLAY_MUSIC to the macro data M, as indicated in a state R222. When a new piece of intent information is added to the macro data M, the information processing server 100 may also add entity information linked to the intent information. The information processing server 100 then causes the smart speaker 10 to execute the macro data M after the change. As indicated in a state R223, the information processing server 100 then causes the smart speaker 10 to output voice, "From now on, music will be played, too", for example. The information processing server 100 then updates the macro data M stored in the storage unit 120 with the macro data M after the change. As a result, the smart speaker 10 notifies the user U of the checked weather, five-minute news, and schedule, and plays music. If the user U speaks "check morning news", the smart speaker 10 notifies the user U of the checked weather, five-minute news, and schedule, and plays music.

In a scene SC23 illustrated in FIG. 6, the user U makes a user speech UO23 "check morning news without schedule", in order to cause the macro data M illustrated in FIG. 4 to be executed while making a change thereto. In this case, the smart speaker 10 transmits the speech data D indicating the user speech UO23 to the information processing server 100. The information processing server 100 analyzes the received speech data D, and extracts the first message and the second message from the user speech UO23. As indicated in a state R221, the information processing server 100 extracts the first message indicating "check morning news", and the second message indicating "without schedule". The information processing server 100 then presumes the element to be changed in the macro data M, based on the second message and the presuming table 121. In this case, because it is an omission of the intent information M13 from the macro data M, the information processing server 100 establishes the intent information M13 as the element to be changed. The information processing server 100 changes to omit CHECK_SCHEDULE from the intent information M13, as indicated in a state R232. For example, the information processing server 100 may delete the intent information M13, or mask the intent information M13 by setting the setting information of the entity information M23 to null. The information processing server 100 then causes the smart speaker 10 to execute the macro data M after the change. As a result, the smart speaker 10 notifies the user U of the checked weather and five-minute news.

As indicated in a state R233, the information processing server 100 asks the user U to confirm the change in the registered macro data M, by causing the smart speaker 10 to output voice "Shall we omit schedule from next time?", for example. For example, if the user U wants to change, the information processing server 100 updates the macro data M stored in the storage unit 120 with the macro data M after the change. For example, if the user U does not want to change, the information processing server 100 does not change the macro data M stored in the storage unit 120.

As described above, when the second message includes a message related to a change in the intent information of the macro data M (first information), the information processing server 100 according to the embodiment changes the intent information that can be changed with the second message. In this manner, the information processing server 100 can change the intent information in the macro data M using the second message spoken with the first message. As a result, because the information processing server 100 can make a change such as an addition or a deletion of a function to or from the macro data M with voice, the convenience of the user U can be improved further.

Furthermore, when the second message is presumed to be a message for adding intent information to the macro data M, the information processing server 100 adds the entity information to the macro data M. When it is presumed that the second message is a message for deleting the intent information in the macro data M, the information processing server 100 deletes the intent information from the macro data M. As a result, the information processing server 100 can add and delete a function specified in the macro data M using a user speech, and can cause the smart speaker 10 to execute a function in accordance with the expectation of the user U. As a result, the information processing server 100 can implement a dynamic change in a function in the basic macro data M, based on the user speech.

Modification (1) of Embodiment

Figure 7:
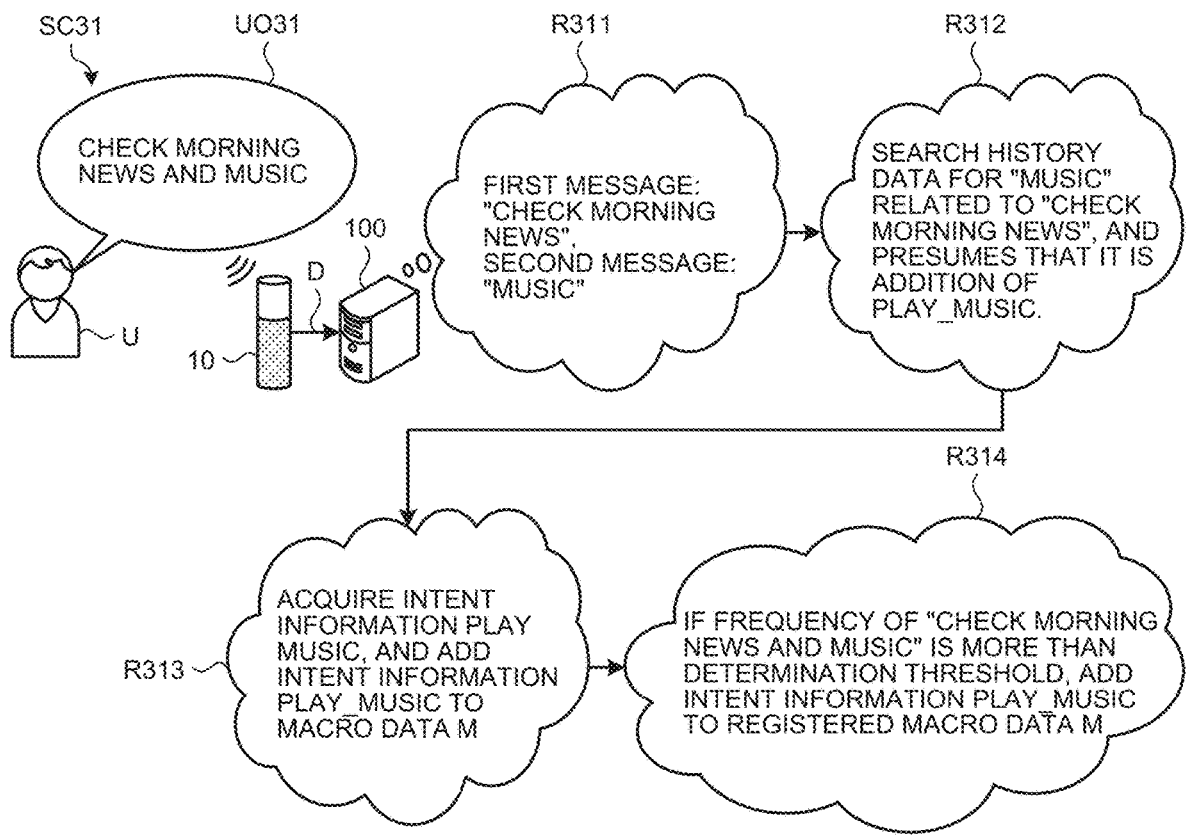
FIG. 7 is a schematic illustrating one example of an operation of an information processing system according to a modification (1) of the embodiment.

One example of information processing performed by the information processing system 1 according to the embodiment will now be explained with reference to FIGS. 4 and 7. FIG. 7 is a schematic illustrating one example of an operation of the information processing system 1 according to a modification (1) of the embodiment.

In a scene SC31 illustrated in FIG. 7, the user U makes a user speech UO31 "check morning news and music", in order to cause the macro data M illustrated in FIG. 4 to be executed while making a change thereto. In this case, the smart speaker 10 transmits the speech data D indicating the user speech UO31 to the information processing server 100. The information processing server 100 analyzes the received speech data D, and extracts the first message and the second message from the user speech UO31. As indicated in a state R311, the information processing server 100 extracts the first message indicating "check morning news", and the second message indicating "and music". The information processing server 100 then presumes the element to be changed in the macro data M, based on the second message and the presuming table 121. In this case, it is assumed that the information processing server 100 has difficulty in presuming whether the addition of the intent information to the macro data M is play music. As indicated in a state R312, the information processing server 100 searches the history data 122 for "music" related to "check morning news", and presumes that it is an addition of PLAY_MUSIC. The information processing server 100 acquires the intent information play music, and adds the intent information PLAY_MUSIC to the macro data M, as indicated in a state R313. When a new piece of intent information is added to the macro data M, the information processing server 100 may also add entity information linked to the intent information. The information processing server 100 then causes the smart speaker 10 to execute the macro data M after the change. As a result, the smart speaker 10 notifies the user U of the checked weather, five-minute news, and schedule, and plays music. Furthermore, as indicated in a state R314, if the frequency of the speech "check morning news and music" is more than a determination threshold, the information processing server 100 changes the macro data M in the storage unit 120 by adding the intent information PLAY_MUSIC to the registered macro data M in the storage unit 120.

As described above, when it is difficult to presume the second message, the information processing server 100 according to the modification (1) of the embodiment changes the macro data M based on the second message and the history data 122. In this manner, even when the user U shortens a speech, or when the information processing server 100 fails to collect the second message, for example, the information processing server 100 can change the macro data M based on the history of executions of the macro data M. As a result, the information processing server 100 can improve the convenience of the user U further, when a function of the macro data M is changed.

Furthermore, explained above is an example in which the information processing system 1 according to the modification (1) of the embodiment adds a new piece of intent information to the macro data M based on the frequency of the history data 122, but the embodiment is not limited thereto. For example, the information processing system 1 may also change the entity information in the macro data M, based on the history data 122. Specifically, when one-minute version of CHECK_NEWS is changed frequently in the macro data M as illustrated in FIG. 4, the information processing system 1 may also change the entity information M22 to [TIME: 1 min].

Modification (2) of Embodiment

Figure 8:
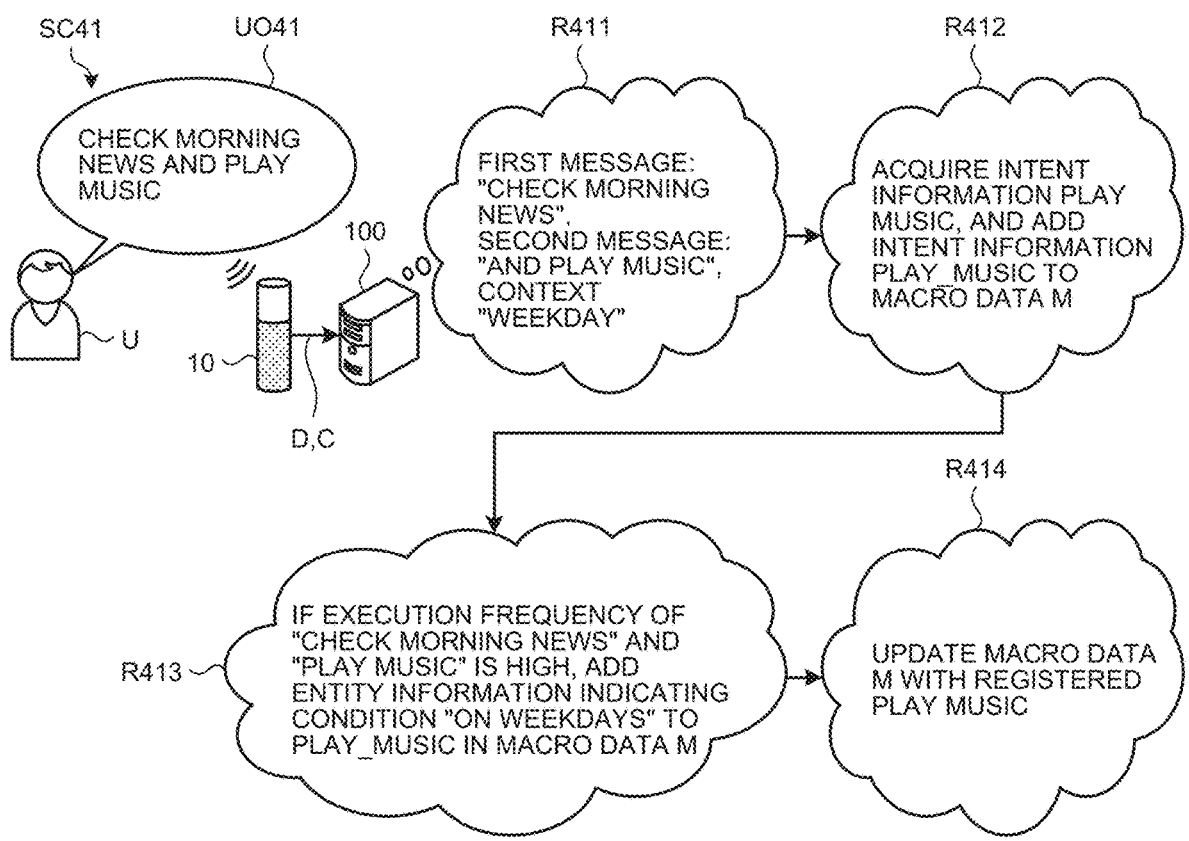
FIG. 8 is a schematic illustrating one example of information processing performed by the information processing system according to a modification (2) of the embodiment.
Figure 9:
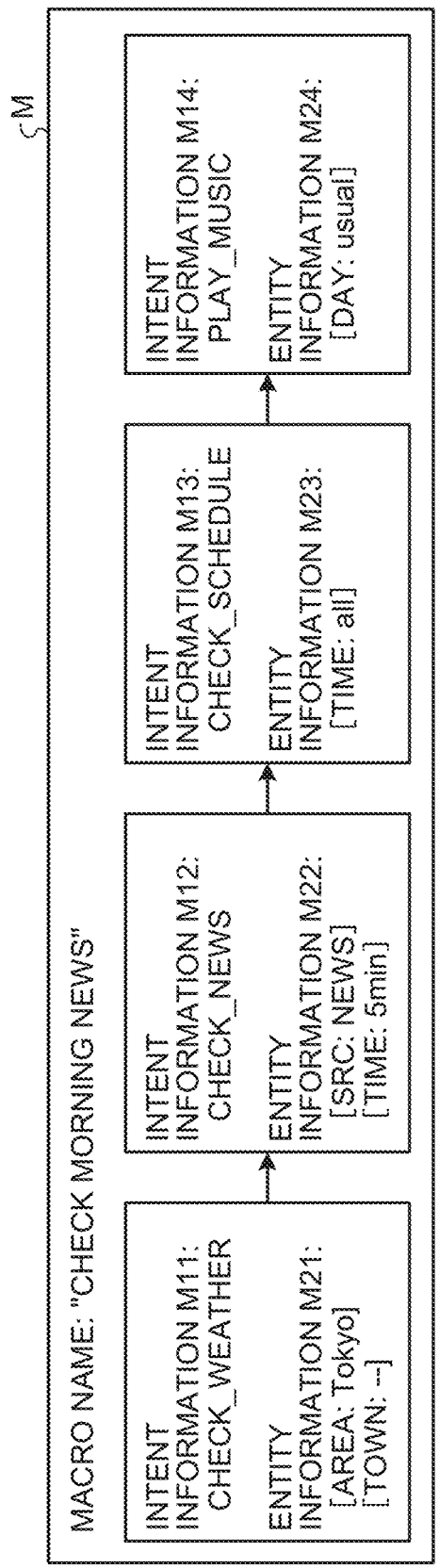
FIG. 9 is a schematic illustrating an example of a change in the macro data according to the modification (2) of the embodiment.

Information processing performed by the information processing system 1 according to the modification (2) of the embodiment will now be explained with reference to FIGS. 4, 8, and 9. FIG. 8 is a schematic illustrating one example of information processing performed by the information processing system 1 according to the modification (2) of the embodiment. FIG. 9 is a schematic illustrating an exemplary change of the macro data M according to the modification (2) of the embodiment.

In a scene SC41 illustrated in FIG. 8, the user U makes a user speech UO41 "check morning news and play music", in order to cause the macro data M illustrated in FIG. 4 to be executed while making a change thereto. In this case, the smart speaker 10 transmits the speech data D indicating the user speech UO41 to the information processing server 100, and also transmits a context C at the time when the speech of the user U is made. The context C includes information such as the time, date, and day of the week on which the user speech UO41 is made. The information processing server 100 analyzes the received speech data D, and extracts the first message and the second message from the user speech UO41. The information processing server 100 analyzes the received context C, and identifies that the user speech UO41 has been made on a weekday. As indicated in a state R411, the information processing server 100 extracts the first message indicating "check morning news", and the second message indicating "and play music", and identifies "weekday" from the context C. As indicated in a state R412, the information processing server 100 then acquires the intent information play music, and adds the intent information PLAY_MUSIC to the macro data M. When a new piece of intent information is added to the macro data M, the information processing server 100 may also add entity information linked to the intent information. The information processing server 100 then causes the smart speaker 10 to execute the macro data M after the change.

The information processing server 100 also obtains the frequency of occurrence of "check morning news and play music" on the weekdays by referring to the history data 122. As indicated in a state R413, if the execution frequency of "check morning news" and "play music" is high, the information processing server 100 adds entity information indicating a condition "on weekdays", to PLAY_MUSIC in the macro data M. As indicated in a state R414, the information processing server 100 updates the registered macro data M. As a result, to the macro data M "check morning news", intent information M14 and entity information M24 are added, as illustrated in FIG. 9. To the macro data M, PLAY_MUSIC is set as the intent information M14. PLAY_MUSIC is the name of a module for playing music. To the macro data M, [DAY: usual] is set, as the entity information M24 of the intent information M14. [DAY: usual] is a condition of PLAY_MUSIC, and indicates that the condition is weekdays.

Explained in the modification (2) of the embodiment is an example in which the information processing server 100 adds new pieces of intent information M14 and entity information M24 to the registered macro data M, but the embodiment is not limited thereto. For example, the information processing server 100 may add entity information indicating a condition to the registered macro data M, as the entity information of the intent information.

As described above, the information processing server 100 according to the modification (2) of the embodiment changes the macro data based on the timing at which the first message is extracted from the user speech, and on the history data 122. In this manner, the information processing server 100 can add a condition suitable for lifestyle of the user U to the macro data M, based on the timing at which the macro data M is executed, and on the history of changes in the macro data M. As a result, because the information processing server 100 can change the macro data M in the way the user U expects, it is possible to contribute to the effective use of the macro data M.

Furthermore, when a new piece of intent information is added to the macro data M, the information processing system 1 according to the modification (2) of the embodiment can add various different conditions. For example, the information processing system 1 may condition the user U to confirm, as a condition for a new piece of intent information. In this case, if the user U speaks "check morning news" after a new piece of intent information is added, the information processing system 1 may notify the user U of a confirmation message such as "Do you listen to music, too?", for example.

Furthermore, according to the modification (2) of the embodiment, when a new piece of intent information is added to the macro data M, the information processing system 1 may add a plurality of conditions in combination. For example, suppose that the user U often speaks "check morning news in one minute" on a weekend. In this case, the information processing system 1 may change [TIME: 5 min] in the entity information M22 in the macro data M illustrated in FIG. 4, to [TIME: 1 min], and add a condition indicating "on a weekend".

Modification (3) of Embodiment

Figure 10:
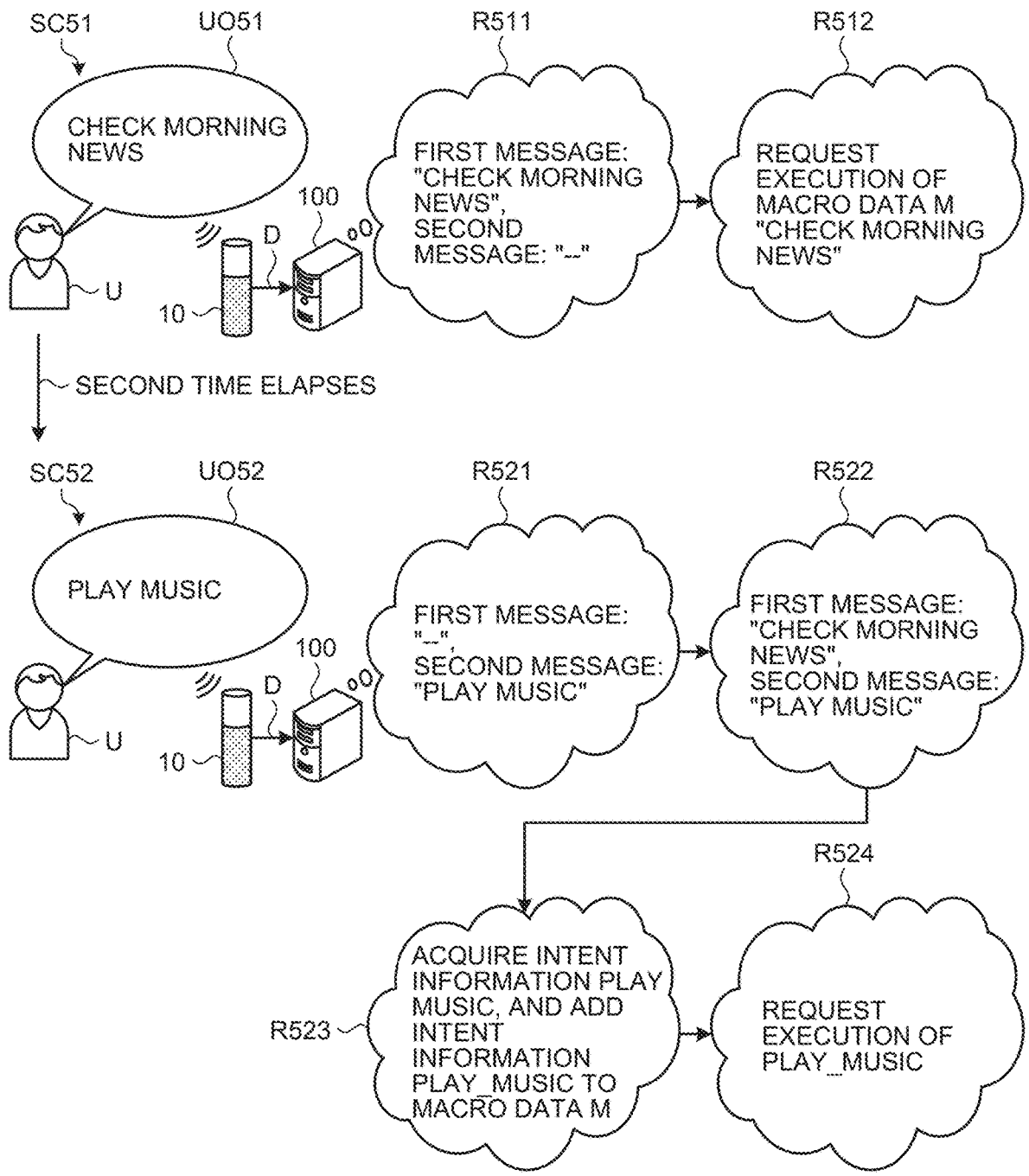
FIG. 10 is a schematic illustrating one example of information processing performed by the information processing system according to a modification (3) of the embodiment.

Information processing performed by the information processing system 1 according to a modification (3) of the embodiment will now be explained with reference to FIG. 4 described above, and FIG. 10. FIG. 10 is a schematic illustrating one example of the information processing performed by the information processing system 1 according to the modification (3) of the embodiment.

In a scene SC51 illustrated in FIG. 10, the user U makes a user speech UO51 "check morning news", in order to cause the macro data M illustrated in FIG. 4 to be executed. In this case, the smart speaker 10 transmits the speech data D indicating the user speech UO51 to the information processing server 100. The information processing server 100 analyzes the received speech data D, and performs a process of extracting the first message and the second message from the user speech UO51. In this case, as indicated in a state R511, the information processing server 100 extracts only the first message indicating "check morning news". As indicated in a state R512, the information processing server 100 then requests the execution of the macro data M "check morning news" from the smart speaker 10. As a result, the smart speaker 10 notifies the user U of the checked weather, news, and today's schedule.

The user U makes a user speech UO52 "play music" after second time has elapsed from when the user U makes the user speech UO51. The second time is a time shorter than the first time (for example, 2, 3 minutes), for example. In this case, the smart speaker 10 transmits the speech data D indicating the user speech UO52 to the information processing server 100. The information processing server 100 analyzes the received speech data D, and performs a process of extracting the first message and the second message from the user speech UO52. As indicated in a state R521, the information processing server 100 extracts the second message indicating "play music", without extracting the first message. The information processing server 100 then presumes the element to be changed in the macro data M corresponding to the first message immediately preceding the extraction of the second message. As a result, as indicated in a state R522, the information processing server 100 extracts the first message indicating "check morning news", and the second message indicating "play music". As indicated in a state R523, the information processing server 100 then acquires the intent information play music, and adds the intent information PLAY_MUSIC to the macro data M. In this case, the macro data M "check morning news" is being executed by the smart speaker 10. Therefore, as indicated in a state R524, the information processing server 100 requests an execution of PLAY_MUSIC from the smart speaker 10. As a result, the smart speaker 10 notifies the user U of checked weather, news, today's schedule, and plays music as well.

As described above, when the second message is extracted from another user speech made before the first time elapses from when the first message is extracted, the information processing server 100 according to the modification (3) of the embodiment presumes the element to be changed in the macro data corresponding to the first message immediately preceding the extraction of the second message, based on the second message. In this manner, the information processing server 100 can change one piece of macro data M even when there is a time lag between the user speeches. As a result, because the information processing server 100 can change the macro data M in the way the user U expects, without the user U making all of the speeches at the same time, it is possible to contribute to the effective use of the macro data M.

[Hardware Configuration]

Figure 11:
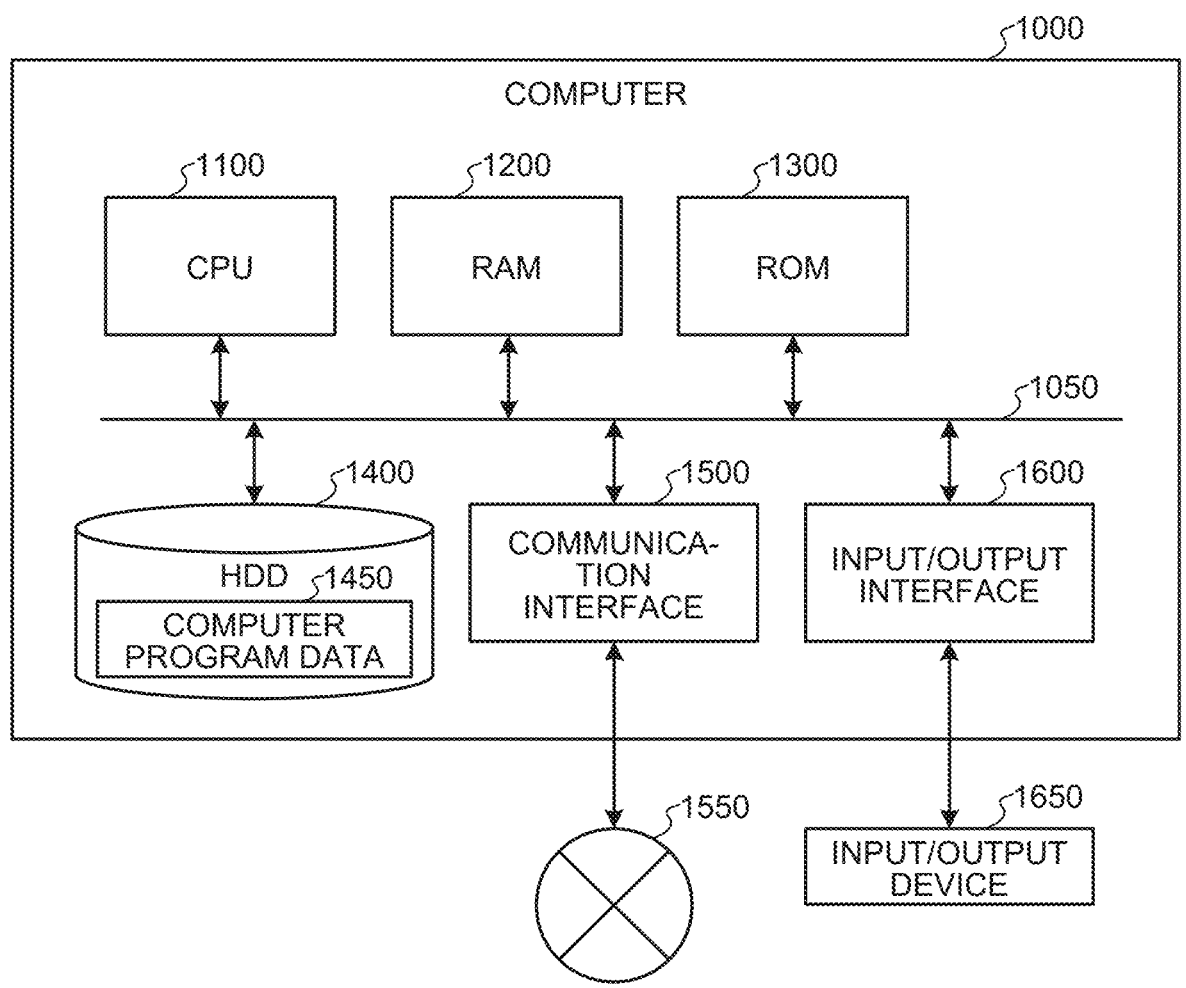
FIG. 11 is a schematic illustrating one example of a hardware configuration of a computer implementing a function of an information processing server.

Information devices such as the information processing server 100, the smart speaker 10, and the like according to the embodiment described above are implemented as a computer 1000 having a configuration illustrated in FIG. 11, for example. The information processing server 100 according to the embodiment will now be explained, as an example. FIG. 11 is a schematic illustrating one example of a hardware configuration of the computer 1000 implementing the functions of the information processing server 100. The computer 1000 includes a CPU 1100, a RAM 1200, a read-only memory (ROM) 1300, a hard disk drive (HDD) 1400, a communication interface 1500, and an input/output interface 1600. These units in the computer 1000 are connected by a bus 1050.

The CPU 1100 operates based on a computer program stored in the ROM 1300 or the HDD 1400, and performs control of these units. For example, the CPU 1100 loads a computer program stored in the ROM 1300 or the HDD 1400 onto the RAM 1200, and executes processes corresponding to various computer programs.

The ROM 1300 stores therein a boot program such as basic input output system (BIOS) executed by the CPU 1100 when the computer 1000 is started, and a computer program and the like that are dependent on the hardware of the computer 1000.

The HDD 1400 is a computer-readable recording medium that stores therein a computer program executed by the CPU 1100, and data or the like used by the computer program, in a non-temporarily fashion. Specifically, the HDD 1400 is a recording medium for recording the information processing program according to the present disclosure that is one example of computer program data 1450.

The communication interface 1500 is an interface for the computer 1000 to connect to the external network 1550 (e.g., the Internet). For example, the CPU 1100 receives data from another device, or transmits data generated by the CPU 1100 to another device, via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 also transmits data to an output device such as a display, a speaker, or a printer, via the input/output interface 1600. Furthermore, the input/output interface 1600 may also function as a medium interface for reading a computer program or the like stored in a predetermined recording medium. Examples of the medium include an optical recording medium such as a digital versatile disc (DVD), an opto-magnetic recording medium such as a magneto-optical disc (MO), a tape medium, a magnetic recording medium, or a semiconductor memory.

When the computer 1000 functions as the information processing server 100 according to the embodiment, for example, the CPU 1100 in the computer 1000 implements functions such as those of the acquiring unit 131, the speech recognizing unit 132, the extracting unit 133, the presuming unit 134, the changing unit 135, and the transmitting unit 136, by executing the information processing program loaded onto the RAM 1200. The information processing program according to the present disclosure, and data in the storage unit 120 are stored in the HDD 1400. The CPU 1100 reads and executes the computer program data 1450 from the HDD 1400, but as another example, the CPU 1100 may acquire the computer program from another device via the external network 1550.

In the embodiment described above, the information processing server 100 can change the macro data M for each user U when a plurality of users U use common macro data M. As a result, the information processing server 100 enables each of the users U to change the common macro data M in a manner suitable for the expectations of the users. In this manner, the common macro data M can be used effectively.

Explained in the embodiment described above is an example in which the information processing apparatus is implemented in the information processing system 1 including the smart speaker 10 and the information processing server 100, but the embodiment is not limited thereto. For example, the information processing apparatus may be implemented in the smart speaker 10, and the smart speaker 10 may be provided with the functions of the information processing server 100.

A preferred embodiment according to the present disclosure has been explained in detail with reference to the appended drawings, but the technical scope of the present disclosure is not limited to such an example. It should be clear to those having ordinary knowledge in the technical field of the present disclosure that it is possible to arrive at various changed examples or modified examples, and it should be understood that those examples still fall within the technical scope of the present disclosure.

Furthermore, the advantageous effects described herein are merely explanatory or exemplary, and are not limiting. In other words, the technology according to the present disclosure can exert other advantageous effects that are clear to those skilled in the art from the description herein, in addition to or instead of the advantageous effects described above.

Furthermore, it is possible to create a computer program for implementing the functions that are equivalent to those of the information processing server 100, in hardware such as the CPU, the ROM, and the RAM provided internally to the computer, and it is also possible to provide a computer-readable recording medium recording therein such a computer program.

Furthermore, the steps related to the processes performed by the information processing server 100 described herein do not necessarily need to be processed in the temporal order in the sequence described in the flowchart. For example, the steps related to the processes performed by the information processing server 100 may be processed in an order different from that described in the flowchart, or processed in parallel.

The following configurations also fall within the technological scope of the present disclosure.

(1)

An information processing apparatus comprising:
    an extracting unit that extracts a changing message related to a change in macro data, the changing message including at least one piece of first information indicating a function to be executed, and second information linked to the first information, from a user speech;
    a presuming unit that presumes an element to be changed in the macro data, based on the changing message extracted by the extracting unit; and
    a changing unit that changes the element to be changed in the macro data based on the changing message, the element to be changed being presumed by the presuming unit.

(2)

The information processing apparatus according to (1), wherein
    when the changing message includes a message related to the second information in the macro data, the presuming unit presumes the second information that is changeable with the changing message as the element to be changed, and
    the changing unit changes the second information presumed by the presuming unit, based on the changing message.

(3)

The information processing apparatus according to (1) or (2), wherein
    the second information includes setting item information for the first information linked thereto, and setting information set to the setting item information, and the changing unit changes the setting information for the second information presumed by the presuming unit based on the changing message.

(4)

The information processing apparatus according to (2) or (3), wherein when the changing message is a message related to a plurality of pieces of second information in the macro data, the presuming unit presumes the pieces of second information that are changeable with the changing message as the element to be changed, and the changing unit executes a process for confirming a change in the pieces of second information presumed by the presuming unit.

(5)

The information processing apparatus according to any one of (1) to (4), wherein when the changing message includes a message related to a change in the first information in the macro data, the presuming unit presumes the first information as the element to be changed, and the changing unit changes the first information presumed by the presuming unit, based on the changing message.

(6)

The information processing apparatus according to (5), wherein the presuming unit presumes whether the changing message is an addition of the first information to the macro data, or a message for deleting the first information from the macro data, when the presuming unit presumes that the changing message is a message for adding the first information to the macro data, the changing unit adds the first information to the macro data, and when the presuming unit presumes that the changing message is a message for deleting the first information in the macro data, the changing unit deletes the first information from the macro data.

(7)

The information processing apparatus according to any one of (1) to (6), further comprising:

a storage unit that stores therein history data indicating a history of changes made in the macro data, made by the changing unit, wherein the changing unit changes the macro data based on the changing message and the history data.

(8)

The information processing apparatus according to (7), wherein the extracting unit extracts the first message serving as a trigger for an execution of the macro data, from the user speech, and the changing unit adds a condition to a function in the macro data based on a timing at which the first message is extracted by the extracting unit, and based on the history data.

(9)

The information processing apparatus according to (8), further comprising:

a collecting unit that collects the user speech, wherein the extracting unit extracts the first message and the changing message from the user speech collected by the collecting unit.

(10)

The information processing apparatus according to (8) or (9), wherein the extracting unit extracts the changing message from the user speech including the first message.

(11)

The information processing apparatus according to any one of (8) to (10), wherein when the extracting unit extracts the changing message from another user speech not including the first message, before first time elapses from when the first message is extracted by the extracting unit, the presuming unit presumes an element to be changed in the macro data corresponding to the first message, based on a changing message immediately preceding the extraction of the changing message.

(12)

The information processing apparatus according to any one of (1) to (11), wherein the changing unit notifies a user of a detail of a change in the macro data.

(13)

The information processing apparatus according to any one of (1) to (12), further comprising a storage unit that stores therein the macro data, wherein the changing unit performs control for changing the macro data stored in the storage unit to macro data after a change.

(14)

The information processing apparatus according to any one of (1) to (13), further comprising an executing unit that executes the macro data changed by the changing unit.

(15)

The information processing apparatus according to (14), wherein the extracting unit extracts a first message serving as a trigger for an execution of the macro data, and when the extracting unit extracts the first message, but the changing message is not extracted, the executing unit executes the macro data using the first message as a trigger.

(16)

An information processing method for causing a computer to execute:

extracting a changing message related to a change in macro data, the changing message including at least one piece of first information indicating a function to be executed, and second information linked to the first information, from a user speech;

presuming the element to be changed in the macro data based on the extracted changing message; and changing the presumed element to be changed in the macro data based on the changing message.

(17)

An information processing system comprising:

a user terminal and an information processing server that is capable of communicating with the user terminal, wherein the user terminal includes:

a collecting unit that collects a speech of the user, and the information processing server includes:

an extracting unit that extracts a changing message related to a change in macro data, the changing message including at least one piece of first information indicating a function to be executed, and second information linked to the first information, from a user speech;

a presuming unit that presumes an element to be changed in the macro data, based on the changing message extracted by the extracting unit; and a changing unit that changes an element to be changed in the macro data based on the changing message, the element to be changed being presumed by the presuming unit.

REFERENCE SIGNS LIST 1 information processing system
10 smart speaker
11 sensor
12 sound collecting unit
13 control unit
14 transmitting unit
15 receiving unit
16 executing unit
17 output unit
100 information processing server
120 storage unit
121 presuming table
122 history data
131 acquiring unit
132 speech recognizing unit
133 extracting unit
134 presuming unit
135 changing unit
136 transmitting unit
M macro data

The invention claimed is:

1. An information processing apparatus comprising:
an extracting unit that extracts a changing message related to a change in macro data, the changing message including at least one piece of first information indicating a function to be executed, and second information linked to the first information, from a user speech;
a presuming unit that presumes an element to be changed in the macro data, based on the changing message extracted by the extracting unit; and
a changing unit that changes the element to be changed in the macro data based on the changing message, the element to be changed being presumed by the presuming unit.

2. The information processing apparatus according to claim 1, wherein
when the changing message includes a message related to the second information in the macro data, the presuming unit presumes the second information that is changeable with the changing message as the element to be changed, and
the changing unit changes the second information presumed by the presuming unit, based on the changing message.

3. The information processing apparatus according to claim 2, wherein
the second information includes setting item information for the first information linked thereto, and setting information set to the setting item information, and
the changing unit changes the setting information for the second information presumed by the presuming unit based on the changing message.

4. The information processing apparatus according to claim 2, wherein
when the changing message is a message related to a plurality of pieces of second information in the macro data, the presuming unit presumes the pieces of second information that are changeable with the changing message as the element to be changed, and the changing unit executes a process for confirming a change in the pieces of second information presumed by the presuming unit.

5. The information processing apparatus according to claim 1, wherein
when the changing message includes a message related to a change in the first information in the macro data, the presuming unit presumes the first information as the element to be changed, and
the changing unit changes the first information presumed by the presuming unit, based on the changing message.

6. The information processing apparatus according to claim 5, wherein
the presuming unit presumes whether the changing message is an addition of the first information to the macro data, or a message for deleting the first information from the macro data,
when the presuming unit presumes that the changing message is a message for adding the first information to the macro data, the changing unit adds the first information to the macro data, and
when the presuming unit presumes that the changing message is a message for deleting the first information in the macro data, the changing unit deletes the first information from the macro data.

7. The information processing apparatus according to claim 1, further comprising:
a storage unit that stores therein history data indicating a history of changes made in the macro data, made by the changing unit, wherein
the changing unit changes the macro data based on the changing message and the history data.

8. The information processing apparatus according to claim 7, wherein
the extracting unit extracts the first message serving as a trigger for an execution of the macro data, from the user speech, and
the changing unit adds a condition to a function in the macro data based on a timing at which the first message is extracted by the extracting unit, and based on the history data.

9. The information processing apparatus according to claim 8, further comprising:
a collecting unit that collects the user speech, wherein
the extracting unit extracts the first message and the changing message from the user speech collected by the collecting unit.

10. The information processing apparatus according to claim 8, wherein the extracting unit extracts the changing message from the user speech including the first message.

11. The information processing apparatus according to claim 8, wherein
when the extracting unit extracts the changing message from another user speech not including the first message, before first time elapses from when the first message is extracted by the extracting unit,
the presuming unit presumes an element to be changed in the macro data corresponding to the first message, based on a changing message immediately preceding the extraction of the changing message.

12. The information processing apparatus according to claim 1, wherein the changing unit notifies a user of a detail of a change in the macro data.

13. The information processing apparatus according to claim 1, further comprising a storage unit that stores therein the macro data, wherein the changing unit performs control for changing the macro data stored in the storage unit to macro data after a change.

14. The information processing apparatus according to claim 1, further comprising an executing unit that executes the macro data changed by the changing unit.

15. The information processing apparatus according to claim 14, wherein
the extracting unit extracts a first message serving as a trigger for an execution of the macro data, and
when the extracting unit extracts the first message, but the changing message is not extracted, the executing unit executes the macro data using the first message as a trigger.

16. An information processing method for causing a computer to execute:
extracting a changing message related to a change in macro data, the changing message including at least one piece of first information indicating a function to be executed, and second information linked to the first information, from a user speech;
presuming the element to be changed in the macro data based on the extracted changing message; and
changing the presumed element to be changed in the macro data based on the changing message.

* * * * *